Sept. 21, 1965     C. J. SEBO     3,207,532
ELECTRICAL CABLE FITTING
Filed June 22, 1962
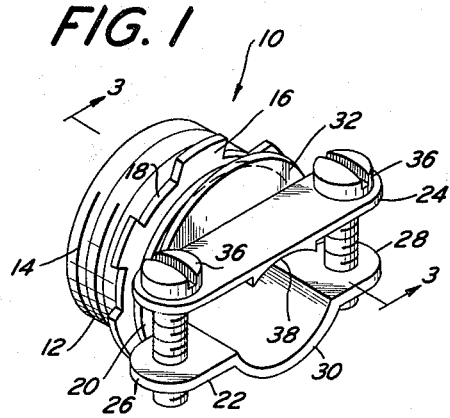
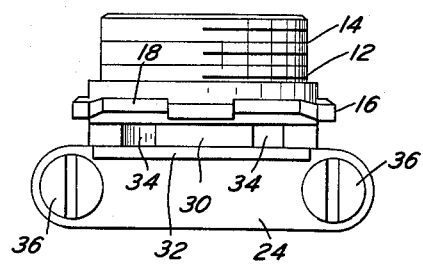
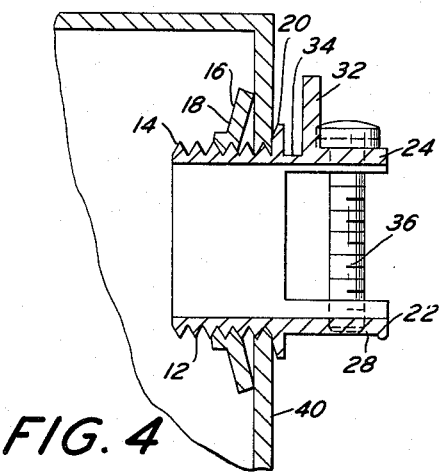
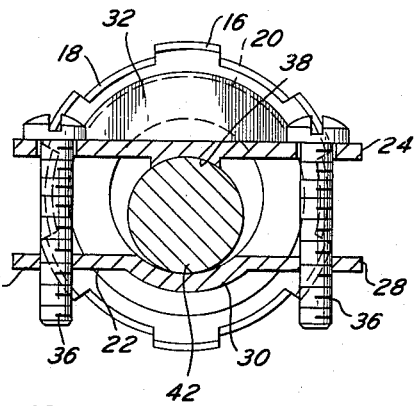
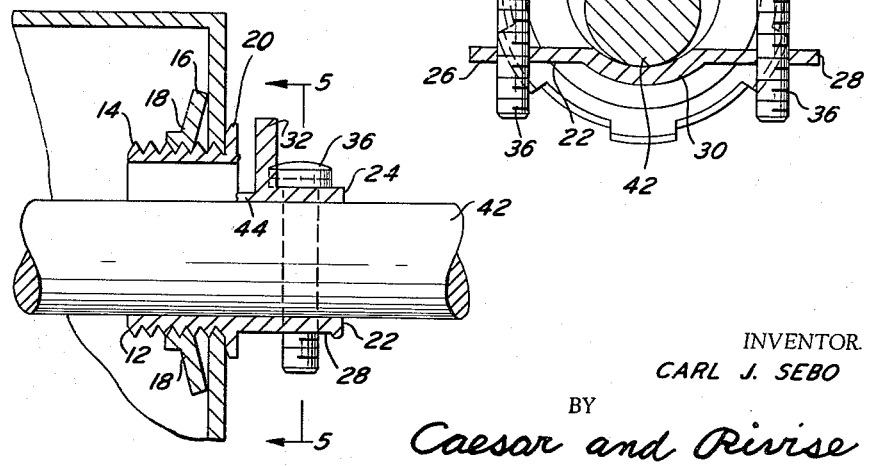
INVENTOR.
CARL J. SEBO
BY
Caesar and Rivise
ATTORNEYS.

United States Patent Office 3,207,532
Patented Sept. 21, 1965

3,207,532
ELECTRICAL CABLE FITTING
Carl J. Sebo, Clarks Summit, Pa., assignor to Atlas Electrical Fittings Co., Scranton, Pa., a corporation of Pennsylvania
Filed June 22, 1962, Ser. No. 204,345
1 Claim. (Cl. 285—4)

This invention relates to an electrical cable fitting and constitutes a new and useful device of this general class.

It is known to provide an electrical cable fitting whereby a cable may pass through an opening and wherein the cable may be securely fastened in order to prevent dislodgement thereof by vibration or other stresses in use.

The electrical cables heretofore used have generally comprised an annular member, threaded at one end and having adjacent the other open end a locking strap, which may be tightened upon the cable after the same has been threaded therethrough. Such a strap is generally secured to the cable fitting by means of two bolts which are tightened after the cable has been threaded therethrough in order to achieve the tightening action just mentioned.

In actual use, however, it is necessary for an electrician to hold the strap in the "open" position or away from its tightened position in order to thread the cable thereunder. The manipulation of this strap can cause quite a bit of inconvenience and distraction and the present applicant has observed that this is a problem of long standing in the art.

It is, therefore, an object of the present invention to provide an electrical cable fitting with a locking strap which will remain in the open position until an electrical cable has been threaded therethrough and which then may be tightened to the locking position as desired by the electrician.

A further object of the present invention is to provide an electrical cable fitting which is economical in construction and simple in use.

The foregoing as well as other objects of the present invention are achieved by providing an electrical cable fitting having a body section of a generally annular construction having formed on one end external threads and a locking nut engaging the same adjacent said one end of the fitting. The opposite end of the fitting comprises the usual bridging section, and a locking strap spaced therefrom and complementary thereto. The locking strap, however, it temporarily secured or staked to the body portion of the electrical cable fitting by means of a frangible section. Aligned openings are provided in the locking strap and in the bridging section to receive the usual tightening bolts. It is thus seen that the locking strap is staked in the open position but can be simply freed by a tightening of the locking bolts.

Other objects and many of the attendant advantages of this invention will be readily appreciated as the same becomes better understood by reference to the following detailed description when considered in connection with the accompanying drawings wherein:

FIG. 1 is a perspective view of an electrical cable fitting constituting an embodiment of the present invention;

FIG. 2 is a top plan view of the fitting of FIG. 1;

FIG. 3 is a sectional view showing the fitting of FIG. 1 secured in the opening of a wall;

FIG. 4 is a view similar to FIG. 3 but showing a cable secured in the electrical cable fitting; and FIG. 5 is an enlarged sectional view taken along the lines 5—5 of FIG. 4.

Referring now in greater detail to the various figures of the drawings wherein similar reference characters refer to similar parts, an electrical cable fitting constituting a first embodiment of the present invention is generally shown at 10 in FIG. 1.

The electrical cable fitting 10 generally comprises an annular body section 12 having external threads 14 formed adjacent one end thereof. A locking nut 16 threadingly engages the threads 14. The locking nut 16 further includes an upstanding annular flange 18 which is adapted to engage or abut against one side of a wall in conjunction with an integral flange 20 projecting from body section 12 and which is positioned on the other side of the wall.

The forward portion of the fitting 10 (as illustrated in FIG. 1) is generally comprised of an integral bridging section 22 and a locking strap 24 spaced therefrom.

The bridging section 22 includes a pair of tabs 26 and 28 spaced apart and held together by means of a concave trough-shaped segment 30 for the purpose of receiving a cable with a generally circular cross-section.

The locking strap 24 includes an integral semi-circular shield 32 which functions to cover a portion of the opening through which the cable passes as will be described in greater detail hereinafter.

Also preferably formed integral with the locking strap 24 as in a casting or molding process are connecting links 34 which are of a frangible material but which serve to hold the strap 24 to the body section 12 until the electrical cable fitting is about to be used (FIG. 2). Where desired, the connecting links 34 may be separate pieces, welded or otherwise joined to the locking strap 24 and the body section 12. Furthermore, the connecting links 34 may be of a thermoplastic material or may otherwise be heat sealed to the locking strap 24 and the body section 12.

As indicated in FIG. 1, bolts 36 extend through complementary openings in the locking strap 24 and in the tabs 26 and 28. Also, the locking strap 24 may further include on its lower surface a concave surface 38 which is complementary of the concave segment 30 in order to receive a cable of a generally circular cross-section.

The use of electrical cable fitting 10 is demonstrated in FIGS. 3, 4 and 5. FIG. 3 shows the electrical cable fitting 10 after the locking nut 16 has been removed, the threads 14 located interiorly of wall 40 and the locking nut 16 replaced on the threads 14 and tightened so that flange 18 of the locking nut 16 abuts against the interior surface of wall 40 and the flange 20 of the body section 12 abuts against the forward section of the wall 40. Up to this time, the connecting links 34 remain unbroken and therefore the locking strap 24 is held away from the bridging section 22 in order that a cable 42 may be quickly run through the annular electrical cable fitting without the electrician having to be concerned with holding the locking strap 24 in the open position above the bridging section 22. Thus, no hands are needed to hold the locking strap 24 inasmuch as it is already in the open position.

After the cable 42 has passed through the electrical cable fitting 10, the bolts 36 are tightened so that the locking strap 24 and the bridging section 22 tend to be drawn toward each other. Since the connecting links 34 are either very thin or are of a frangible material, they quickly break under the compressive stresses created by the tightening of the bolts 26. As soon as connecting links 34 have broken, the locking strap 24 moves against the bridging section 22 as the bolt 26 is tightened (FIG. 4). (The fragmentary or broken connecting links are indicated at 44 on FIG. 4.) As the locking strap 26 is no longer staked in the open position, it may be simply tightened upon the cable 42 in a manner as heretofore known.

Obviously many modifications and variations of the present invention are possible in the light of the above teachings. It is, therefore, to be understood that within the scope of the appended claim, the invention may be practiced otherwise than as specifically described.

What is claimed as the invention is:

An electrical cable fitting adapted to receive an electrical cable and adapted to be secured through an opening in a wall, said fitting comprising an annular body section with a generally centrally located peripheral flange extending radially outwardly therefrom, said body section having formed adjacent a first end thereof, external threads extending toward said flange, said body section having formed adjacent a second end thereof an integral stationary bridging section and an initially stationary locking strap spaced diametrically therefrom and in substantially parallel relation thereto, at least one integral frangible connecting link integrally formed between said peripheral flange and said locking strap, said locking strap being temporarily secured to said body section by means of at least one integral frangible connecting link, so that said locking strap is initially staked in a stationary open position radially displaced above said bridging section, whereby the staking of said strap in the open position permits the leading of electrical cable between said bridging section and said strap aligned bolt receiving apertures in each of said strap and bridging sections and bolts in said apparatus, whereby said bolts may be thereafter tightened to break said frangible link and tighten said strap on said cable, said first end of said body section extending through said wall with said flange being positioned flush against said wall and a locking nut being located on said threads to be tightened against said wall and against said flange.

References Cited by the Examiner
UNITED STATES PATENTS

| | | | |
|---|---|---|---|
| 309,414 | 12/84 | Smith | 85—17 |
| 712,422 | 10/02 | Stokes | 85—17 X |
| 1,792,235 | 2/31 | Maynard | |
| 2,451,421 | 10/48 | Wayman | 285—158 |
| 2,650,110 | 8/53 | Harrison | 285—159 |
| 2,940,081 | 6/60 | Juilfs | 85—17 X |
| 3,004,776 | 10/61 | Sebardt | 285—3 |
| 3,006,981 | 10/61 | Weber | 285—161 X |

CARL W. TOMLIN, *Primary Examiner.*